United States Patent Office 3,404,857
Patented Oct. 8, 1968

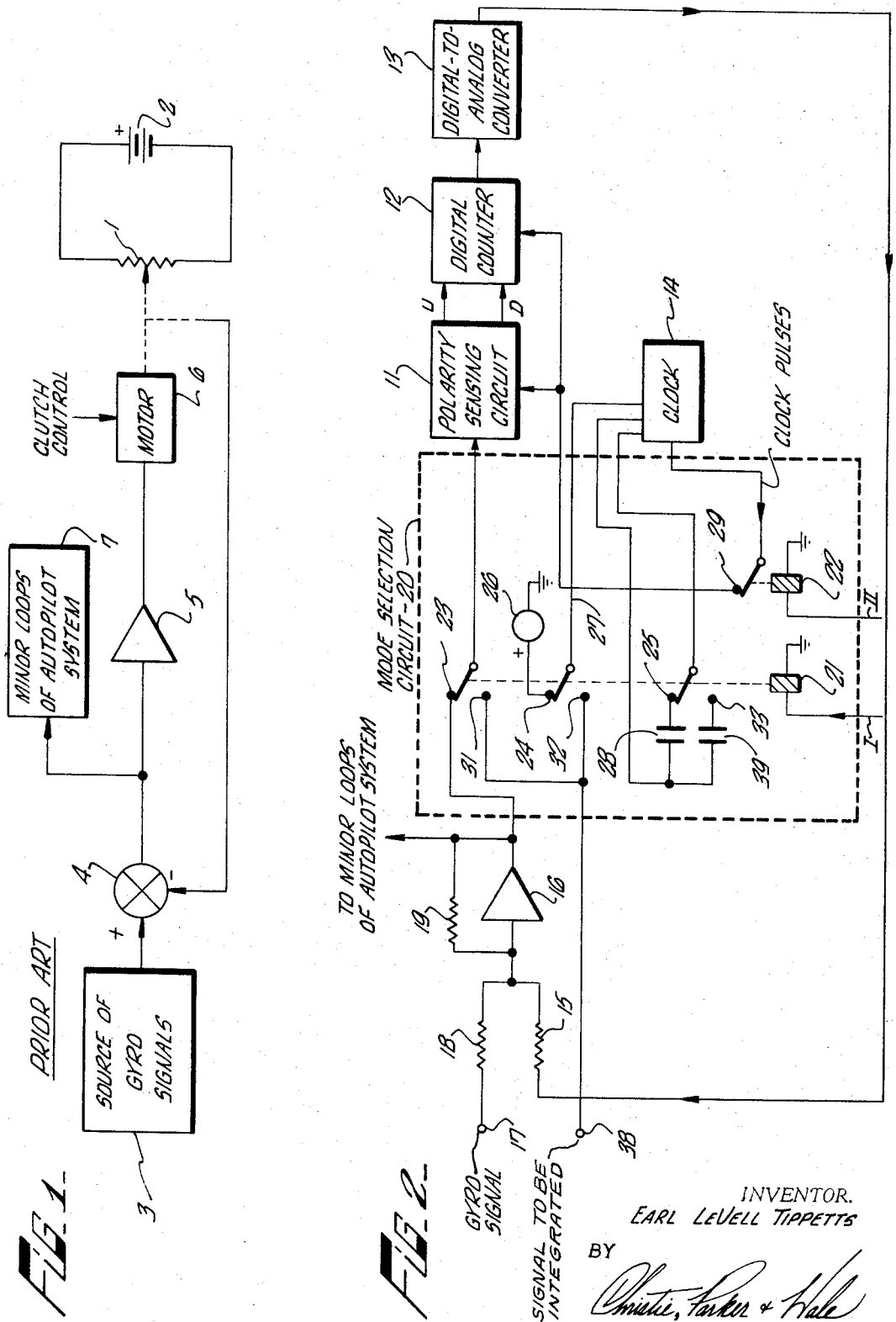

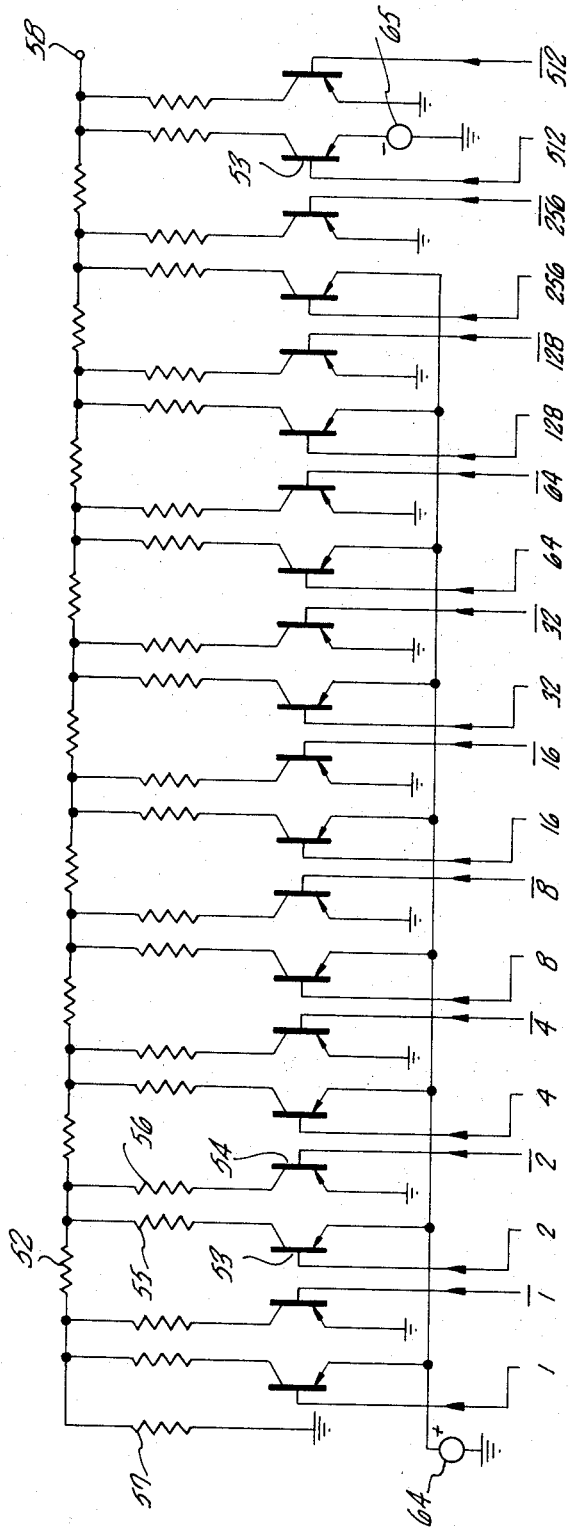
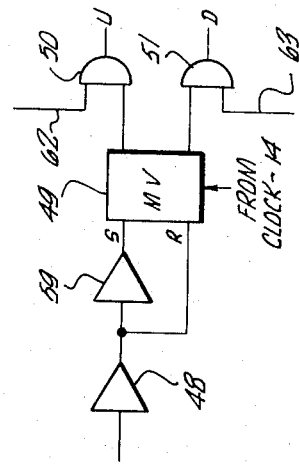
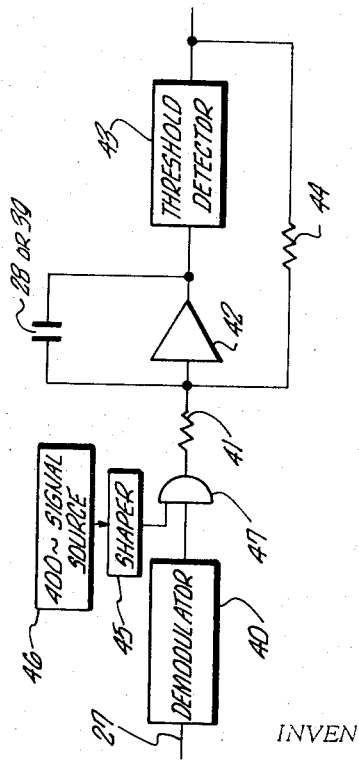

3,404,857
SIGNAL GENERATOR FOR CONTROL SYSTEMS
Earl Le Vell Tippetts, Manhattan Beach, Calif., assignor to Lear Siegler, Inc., Santa Monica, Calif., a corporation of Delaware
Filed Oct. 12, 1966, Ser. No. 586,269
9 Claims. (Cl. 244—77)

ABSTRACT OF THE DISCLOSURE

A completely electrical signal generator adaptable to generate either a nulling signal or an integral signal. The input to the signal generator comprises a polarity sensing circuit that controls the operation of a digital counter. The counter operates responsive to the pulses produced by a clock source whose frequency is dependent upon the magnitude of an input signal. Depending upon the instantaneous polarity of a signal applied to the polarity sensing circuit, the counter either counts up or down at a rate determined by the frequency of the clock pulses. The digital output of the counter is converted to an analog signal that constitutes the output signal of the signal generator.

---

This invention relates to signal generators particularly well suited for use in control systems and, more specifically, to a signal generator that is adaptable to produce in response to an applied signal either a nulling or an integral signal, depending upon the mode of operation selected.

In the control system technology, the need sometimes arises to generate a signal that nulls out, that is cancels, a control signal at a summing junction. For example, a so-called synchronizer is employed in autopilot systems to null out the control signals produced by the gyros of the system, while the course or attitude of the aircraft is being changed. Absent such a device, the control loops of the autopilot would resist a course or attitude change, thereby making it impossible of execution without disconnecting or disabling the autopilot. After the change in the course or attitude is executed and a new course or attitude is established, the synchronizer is switched from a synchronize to a hold mode of operation, in which it generates a fixed signal to serve as a reference for comparison with the signal generated by the gyro. An error signal that represents deviations of the aircraft from the new course or attitude is thereby produced for application to the control loops of the autopilot system.

Present synchronizers conventionally take the form of a potentiometer having a slider arm positioned by a servomechanism. Thus, the gyro signal and the potentiometer signal are applied to a summing junction, the output of which actuates a motor or other dynamic device that positions the slider arm. As the gyro signal changes, an error signal is produced at the output of the summing junction which drives the motor. As a result, the slider arm is adjusted so as to reduce the error signal. Consequently, the potentiometer signal follows changes in and nulls out the gyro signal at the summing junction. To switch this synchronizer to operate in a hold mode, either the connection between the summing junction and the amplifier driving the motor is broken by opening an electrical switch or the mechanical clutch coupling the potentiometer to the motor is disengaged.

Devices for generating an integral signal are also in common usage in the control system technology. Thus, it is standard practice to ascertain the average error accumulation of a signal by integrating it. Alternating-current control systems, employing for example a 400-cycle carrier, offer many advantages and are in wide use. Electromechanical integrators are often preferred over strictly electrical devices, because they operate directly upon the alternating-current signals without necessity for modulation or demodulation.

The above-described devices suffer from the weaknesses typical of all mechanical and electromechanical mechanisms. They respond slowly, and their parts are subject to wear and frequent breakdown, as compared to strictly electrical devices.

The invention provides a completely electrical signal generator that is adaptable to generate either a nulling signal or an integral signal. The input to the signal generator comprises a polarity sensing circuit that controls the operation of a digital counter. The counter operates responsive to the pulses produced by a clock source whose frequency is dependent on the magnitude of an input signal. Depending upon the instantaneous polarity of the signal applied to the polarity sensing circuit, the counter either counts up or down at a rate determined by the frequency of the clock pulses. The digital output of the counter is converted to an analog signal that constitutes the output signal of the signal generator.

When operating the signal generator to null out a control signal at a summing junction, the analog signal produced at the output is applied to the summing junction with the control signal. The magnitude of the input signal applied to the clock is fixed. The output of the summing junction is coupled to the polarity sensing circuit, which senses the polarity of the signal at the output of the summing junction and causes the counter to count in a direction that tends to reduce the signal at the output of the summing junction. To switch the signal generator to a hold mode of operation, the clock is disconnected. This prevents further operation of the counter.

The signal generator is converted to function as an integrator by applying the signal to be integrated to the input of the polarity sensing circuit and to the clock as its input signal. Through the polarity sensing circuit, the signal to be integrated determines the direction in which the counter counts. Thus, the clock produces pulses at a frequency dependent upon the magnitude of the signal to be integrated which are added and subtracted by the counter, depending on the polarity of the signal to be integrated. The analog signal produced at the output of the signal generator then represents the integral signal.

These and other features of the invention are considered further in the following detailed description taken in conjunction with the drawings, in which:

FIG. 1 is a schematic circuit diagram, partially in block form, illustrating a prior art synchronizer for nulling out a control signal at a summing junction;

FIG. 2 is a schematic circuit diagram, partially in block form, of an embodiment of the signal generator of the invention;

FIG. 3 is a schematic circuit diagram, partially in block form, of the clock shown in FIG. 2;

FIG. 4 is a schematic circuit diagram in block form of the polarity sensing circuit shown in FIG. 2; and FIG. 5 is a schematic circuit diagram of a ladder network that comprises the digital-to-analog converter of FIG. 2.

FIG. 1 shows the typical prior art synchronizer used in autopilot systems to null out the signals generated by the gyros, while the course or attitude of the aircraft is being changed. The nulling signal is generated at the slider arm of a potentiometer 1 that is connected across the terminals of a voltage source 2. The output of a signal source 3, which could for example be the signal generated by the vertical gyro of an autopilot system, is combined at a summing junction 4 with the signal generated at the slider arm of potentiometer 1. After amplification by an amplifier 5, the error signal at the output of summing junction 4 is provided as an actuating signal for a motor 6 that controls the position of the slider arm of potentiometer 1. A clutch control is provided for motor 6.

During the period of time in which a new attitude is being established for the aircraft, the arrangement is operating in a synchronize mode with the clutch engaged so that motor 6 is directly coupled to the slider arm of potentiometer 1. As the gyro signal changes, the arrangement functioning as a standard servomechanism, positions the slider arm of potentiometer 1 so as to follow and null out the gyro signal. Thus, the error signal at the output of summing junction 4, which is applied to the minor loops of the autopilot system designated as block 7, remains substantially zero. As a result, the autopilot system is prevented from taking any corrective action to resist the change in attitude. After the new attitude is established, it is the job of the autopilot system to hold the aircraft to this attitude. The arrangement of FIG. 1 is accordingly placed in a hold mode by disengaging the clutch of motor 6. Thereafter, the position of the slider arm of potentiometer 1 remains fixed. An error signal that is proportional to changes in the actual attitude of the aircraft about the newly established reference attitude represented by the potentiometer setting emanates from summing junction 4 and is applied to the minor loops of the autopilot system to correct the aircraft's actual attitude.

Reference is now made to FIG. 2, which illustrates an embodiment of a signal generator according to the invention. The signal generator itself comprises a polarity sensing circuit 11, a digital counter 12, and a digital-to-analog converter 13 connected in tandem. Circuit 11, which is described in detail below in connection with FIG. 4, has two output leads, designated U and D in FIG. 2. One or the other of these output leads is energized, depending upon the polarity of the signal applied to the input of circuit 11 at predetermined times under the control of the pulses from a clock 14. Clock 14 is described in detail below in connection with FIG. 3. Counter 12 is a conventional, reversible counting circuit. Depending upon whether output lead U or D is energized, counter 12 counts either up or down at a rate that is also controlled by the pulses from clock 14. The digital count registered by counter 12 is transposed to analog form by digital-to-analog converter 13, which is described in detail below in connection with FIG. 5.

The output of digital-to-analog converter 13 is applied through a resistor 15 to the input of a high negative-gain amplifier 16; an input terminal 17 is connected through a resistor 18 to the input of amplifier 16; and the output of amplifier 16 is feedback-coupled to its input through a resistor 19. Amplifier 16 thus serves as an operational amplifier that sums the output signal of digital-to-analog converter 13 and the signal applied to input terminal 17. The signal generator operates in one of three modes—synchronize, hold, or integrate—depending upon the state of input leads I and II of a mode selection circuit 20. In the synchronize and hold modes, a signal (which in the case of an autopilot system would be a gyro signal) is applied to input terminal 17, and no signal is applied to an input terminal 38. In the integrate mode, a signal to be integrated is applied to input terminal 38 and no signal is applied to input terminal 17. In general, the signal applied to input terminal 38 in the integrate mode could be any type of signal the integration of which is required for some purpose. For example, the signal to be integrated could be an error signal generated in one of the control loops of an autopilot system.

With appropriate modifications to the circuitry of elements 11, 12, 13, and 14, the signal generator is adaptable to accommodate either direct-current or alternating-current signals at input terminals 17 and 38. The output of amplifier 16 and terminal 38 are coupled through mode selection circuit 20 to the input of circuit 11 on an alternative basis. Mode selection circuit 20 comprises several transistor switches whose function may best be described by considering the switching function as being performed by two relays having control coils 21 and 22, to which energizing signals are applied by leads I and II, respectively, in order to select the mode of operation of the circuit. Associated with control coil 21 are normally closed relay contacts 23, 24, and 25. Contact 23 completes a circuit from the output of amplifier 16 to the input of circuit 11. Contact 24 completes a circuit from a source 26 of fixed voltage (whether direct or alternating current depends on the form of the signal applied to terminal 17 or 38) through a lead 27 to clock 14. As described further below in connection with FIG. 3, the frequency of operation of clock 14 is directly proportional to the magnitude of the voltage applied to it through lead 27. Thus, when connected to source 26, clock 14 operates at a fixed frequency. Normally closed contact 25 completes a circuit in clock 14, including a timing capacitor 28 that also plays a part in determining the frequency of operation of clock 14. Associated with control coil 22 is a normally closed contact 29 that completes a circuit for clock pulses from clock 14 to circuit 11 and counter 12.

To operate the signal generator in a synchronize mode, that is, to generate a signal at the output of converter 13 that nulls out the signal applied to terminal 17, leads I and II remain deenergized and mode selection circuit 20 is in the state shown in FIG. 2. The voltage at the output of amplifier 16 represents the error or difference between the signal applied to terminal 17 and the output of converter 13. The sense or polarity of this difference is detected by circuit 11, which controls the direction, that is up or down, of counter 12 so as to reduce the difference. While the signal generator is operating in this mode, the signal generated at the output of converter 13 thus follows the signal applied to terminal 17 as it varies, and the output of amplifier 16 remains substantially at zero potential because of the fast response of the signal generator. Thus the attitude and/or course of the aircraft is permitted to change.

To switch the signal generator to a hold mode, lead II is energized. As a result, the connection between clock 14 and counter 12 is broken. This stops further operation of counter 12 and has the effect of maintaining the signal magnitude at the output of converter 13 that exists at the time control coil 22 was energized. Disabling clock 14 is analogous in the signal generator to disengaging the clutch of motor 6 of FIG. 1. In the hold mode, the signal at the output of amplifier 16 actuates the control surfaces of the aircraft through the minor loops of the autopilot system so as to correct the attitude and/or course of the aircraft and bring the gyro signal into agreement with the signal at the output of converter 13, which serves as a reference voltage in this mode.

To operate the signal generator in an integrate mode, lead I is energized, and normally open contacts 31, 32, and 33 associated with control coil 21 close. The signal to be integrated is applied to terminal 38, which is connected through contact 31 to the input of circuit 11 and through contact 32 to lead 27 of clock 14. A capacitor 39 (preferably of larger value than capacitor 28) is also switched into the timing circuit of clock 14 through contact 33 to change (preferably reduce) the order of magnitude of the clock frequency. The signal apppplied to terminal 38 controls the frequency of the pulses produced by clock 14 and therefore the frequency at which digital counter 12 operates. Circuit 11 senses the phase of the signal applied to terminal 38 and controls the direction of counter 12 responsive thereto. As a result, the digital output of counter 12 represents the integral of the signal applied to terminal 38, which is then transformed to analog form by converter 13. The integral signal after being applied to amplifier 16 appears at its output in usable form. In the integrate mode, the signal generator output is not fed back to its input.

FIG. 3 shows clock 14 in detail, assuming that the signal on lead 27 is alternating current. The signal appearing on lead 27 is reduced to direct current by a demodulator 40, after which it is applied through an AND gate 47 and a resistor 41 to the input of a high negative-gain amplifier 42. Either capacitor 28 or 39, depending upon the state of control coil 21 (FIG. 2), is connected in a feedback path from the output to the input of amplifier 42. As a result, amplifier 42 functions as an operational amplifier to integrate the direct-current signal at the output of demodulator 40. In operation, the output signal from amplifier 42 rises until it reaches a value that triggers a threshold detector 43. This time interval depends on the magnitude of the input signal to amplifier 42. The output of threshold detector 43 is coupled by a resistor 44 to the input of amplifier 42. When threshold detector 43 is triggered, the feedback coupling therefrom to the input of amplifier 42 reduces the aggregate signal at the input of amplifier 42 sufficiently to make the output signal of amplifier 42 fall until it drops below the threshold value again and the cycle is repeated. As a result, a continuous train of pulses appear at the output of threshold detector 43 at a repetiton rate determined by the magnitude of the signal on lead 27. Preferably, the pulse rate is selected to be much larger than the frequency of the alternating-current carried in the synchronize mode and much smaller in the integrate mode. Clock pulses appearing at the output of threshold detector 43 are only provided to circuit 11 and digital counter 12 during half cycles of the 400-cycle signal of one polarity, so that circuit 11 senses only changes in polarity attributable to changes in the sense of the difference between the gyro signal and the output signal from converter 13 in the synchronize mode and attributable to changes in the sense of the error signal in the integrate mode. Thus, changes in polarity attributable to the 400-cycle signal itself are ignored by circuit 11. To this end, square wave pulses are produced by a shaper 45 from a signal source 46 that is the 400-cycle reference signal source used to generate the alternating-current signals in the system. The square wave pulses provided by shaper 45 are used to gate the voltage at the output of demodulator 40 through an AND circuit 47 to resistor 41 during half cycles of the 400-cycle reference signal of one polarity.

In FIG. 4 phase sensing circuit 11 is shown in detail. The input to circuit 11 comprises a high-gain amplifier 48. The output of amplifier 48 is applied directly to the reset input of a multivibrator 49 and through a high-gain amplifier 59 to the set input of multivibrator 49. As a result of these connections, signals of opposite polarity are applied to the set and reset input of multivibrator 49. When the signal at the input to circuit 11 changes polarity, the state of multivibrator 49 changes upon application of the next pulse from clock 14. One output of multivibrator 49 is coupled through an AND circuit 50 to lead U, and the other output of multivibrator 49 is coupled through an AND circuit 51 to lead D. AND circuits 50 and 51 serve as stops on the counting operation of counter 12 to prevent recycling thereof. When counter 12 advances to its highest state, an upper limit lead 62 becomes deenergized and AND circuit 50 becomes disabled. Thereafter, counter 12 is only capable of reversing. Similarly, when counter 12 reverses to its lowest state, a lower limit lead 63 becomes deenergized and AND circuit 51 becomes disabled. Thereafter counter 12 is only capable of advancing.

FIG. 5 shows a ladder network that serves as digital-to-analog converter 13. The ladder network comprises a plurality of sections, one corresponding to each stage of digital counter 12. Each section of the ladder network, with the exception of the end sections, comprises two transistors 53 and 54 that function as a switch and a coupling resistor 52. The emitter of transistor 53 is connected to a source 64 of potential of positive polarity, while the emitter of transistor 54 is connected to ground. The collectors of transistors 53 and 54 are coupled by resistors 55 and 56, respectively, to resistor 52. Resistors 55 and 56 are each of twice the value of resistor 52. The bases of transistors 53 and 54 are connected to the pair of output leads of the corresponding stage of counter 12 as indicated in FIG. 5. When a stage of counter 12 is in its "ON" state, its lead to the base of transistor 53 is energized, transistor 53 conducts, and source 64 is connected through the resistor 55 of the corresponding section to an output terminal 58. When the stage of counter 12 is in its "OFF" state, the lead to the base of transistor 54 is energized, transistor 54 conducts, and the corresponding section is connected through resistor 56 to ground. The left end section of the ladder network is identical to the remaining sections, except for a terminating resistor 57, which is of twice the value of resistor 52. The right end section of the ladder network is identical to the remaining sections, except that a source 65 of potential negative polarity equal in magnitude to the potential of source 64 is applied to the emitter of transistor 53. Depending upon the state of counter 12, a voltage appears at terminal 58 that is one of 1024 discrete values ranging between $-\frac{1}{2} KE$ and $+\frac{511}{1024} KE$, where K is constant depending on the resistance of resistors 52, 55, and 56 and E is the magnitude of the potential from sources 64 and 65. The form of the output signal is determined by the nature of sources 64 and 65. If these sources are 400-cycle alternating current according to the previous assumption, then the signal at terminal 58 is a modulated 400-cycle signal. If these sources are batteries or other direct-current power supplies, then the signal at terminal 58 is a direct-current signal. It is by virtue of the fact that any form of signal can be used in a digital-to-analog converter to generate the analog signal that the signal generator according to the invention is able to integrate alternating-current signals.

What is claimed is:

1. A signal generator comprising an input terminal, a reversible digital counter capable of counting in a forward or reverse direction, means responsive to the polarity of the signal at the input terminal for controlling the direction in which the counter counts, a source of clock pulses operating at a frequency dependent upon the magnitude of a signal applied thereto, a source of signals applied to the clock source to control its frequency of operation, means for coupling the clock pulses to the digital counter so that the digital counter counts responsive to the clock pulses, and means for converting the count registered by the digital counter to an analog signal.

2. The combination of claim 1, in which the signal applied to the source of clock pulses has a fixed magnitude so the source operates at a fixed frequency.

3. The combination of claim 1, in which the signal applied to the source of clock pulses has a variable magnitude and is applied to the input terminal so that the magnitude of the analog signal is the integral of the magnitude of the signal applied to the source of clock pulses.

4. The combination of claim 3, in which the signal applied to the source of clock pulses and the input terminal is alternating current having a variable magnitude to be integrated; and the means for converting the count registered by the digital counter to an analog signal comprises a second source of alternating-current signals having the same frequency as the signal applied to the source of clock pulses and the input terminal, and a plurality of resistors selectively insertable into circuit with the second source depending upon the state of the counter so as to attenuate the signal generated by the second source in accordance with the analog value to be produced.

5. The combination of claim 1, in which the means for coupling the clock pulses to the digital counter is disconnectable.

6. The combination of claim 1, in which means are provided for preventing the counter from recycling.

7. The combination of claim 1, in which the means for controlling the direction in which the counter counts generates a signal on one of two leads depending on the direction of the count and separably disconnectable means are provided for coupling the leads to the counter, one of the means being disconnected responsive to the counter's reaching the corresponding limit count.

8. In combination in a closed-loop control system, a first source of signals that varies as a function of the system conditions; a summing junction to which the first source of signals is coupled; a signal generator for producing a signal to null out the signal from the first source at the summing junction comprising a digital counter capable of counting in either a forward or reverse direction, means responsive to the signal at the output of the summing junction for determining the direction in which the counter counts, a source of clock pulses that controls the rate at which the counter counts, means for disabling the source of clock pulses so as to hold the count registered by the digital counter, means for converting the digital count registered by the counter to an analog signal, and means for coupling the analog signal to the summing junction; and means, as part of the control system, responsive to the signal at the output of the summing junction to correct the system conditions.

9. In combination in an autopilot system, a first source of signals generated responsive to a reference gyro on an aircraft; a summing junction to which the source of gyro signals is coupled; a signal generator for producing a nulling signal for the gyro signal at the summing junction comprising a reversible digital counter capable of counting in a forward or reverse direction, means responsive to the polarity of the signal at the output of the summing junction for controlling the direction in which the counter counts, a source of clock pulses coupled to the counter to control its operation, means for inhibiting the operation of the counter so as to hold the nulling signal at a constant value during subsequent variations in the gyro signal, means for converting the digital count of the counter to an analog signal, and means for coupling the analog signal to the summing junction as the nulling signal; and means for coupling the signal at the output of the summing junction to minor loops of the autopilot system to actuate control surfaces of the aircraft.

References Cited

UNITED STATES PATENTS

| | | | |
|---|---|---|---|
| 3,014,211 | 12/1961 | Bussey | 340—347 |
| 3,222,795 | 12/1965 | Gevas | 235—50.25 X |
| 3,225,345 | 12/1965 | Absatz et al. | 340—347 |

FERGUS S. MIDDLETON, *Primary Examiners.*